USO09386856B2

(12) United States Patent
Duffy

(10) Patent No.: US 9,386,856 B2
(45) Date of Patent: Jul. 12, 2016

(54) PAINTING SUPPORT BOARD

(71) Applicant: William P Duffy, Tannersville, NY (US)

(72) Inventor: William P Duffy, Tannersville, NY (US)

(\*) Notice: Subject to any disclaimer, the term of this patent is extended or adjusted under 35 U.S.C. 154(b) by 0 days.

(21) Appl. No.: 14/942,165

(22) Filed: Nov. 16, 2015

(65) Prior Publication Data

US 2016/0066690 A1   Mar. 10, 2016

Related U.S. Application Data

(60) Division of application No. 14/488,320, filed on Sep. 17, 2014, now Pat. No. 9,221,296, which is a continuation-in-part of application No. 13/956,682, filed on Aug. 1, 2013, now Pat. No. 9,180,731.

(60) Provisional application No. 61/717,954, filed on Oct. 24, 2012.

(51) Int. Cl.
*A47B 97/04* (2006.01)
*B44D 3/04* (2006.01)
*B44D 3/00* (2006.01)
*F16B 1/00* (2006.01)

(52) U.S. Cl.
CPC . *A47B 97/04* (2013.01); *B44D 3/00* (2013.01); *B44D 3/04* (2013.01); *F16B 1/00* (2013.01); *F16B 2001/0028* (2013.01); *Y10T 29/49833* (2015.01)

(58) Field of Classification Search
None
See application file for complete search history.

(56) References Cited

U.S. PATENT DOCUMENTS

| | | | | | |
|---|---|---|---|---|---|
| 864,254 | A | * | 8/1907 | Perkins | A47F 3/001 24/457 |
| 997,418 | A | * | 7/1911 | Sayles | B43L 5/00 33/1 AA |
| 1,285,279 | A | * | 11/1918 | McCabe | B43L 5/00 33/1 AA |
| 1,506,368 | A | * | 8/1924 | Fancher | B43L 5/00 269/154 |
| 2,203,474 | A | * | 6/1940 | Stenquist | A47B 27/00 269/254 D |
| 2,503,807 | A | * | 4/1950 | Dolas | B43L 15/00 126/25 R |
| 2,978,813 | A | * | 4/1961 | Gill | B43L 13/005 33/446 |
| 3,514,173 | A | * | 5/1970 | Ford | A47B 97/08 248/461 |
| 3,738,606 | A | | 6/1973 | Millen | |
| 3,785,299 | A | | 1/1974 | Caperton, Jr. | |

(Continued)

OTHER PUBLICATIONS

Craftech International Inc, All in One Pochade BoxéSienna Plein Air, Huntington Beach, CA 92648 Found Originally Aug. 28, 2012 at: www.siennapleinair.com/all-in-one.html.

(Continued)

*Primary Examiner* — Bradley Duckworth
(74) *Attorney, Agent, or Firm* — BK Patents, Inc.; Billy J. Knowles

(57) ABSTRACT

A painting support system that includes a painting support board for holding artist's panels or canvases that is colored to mimic the frame for the finished painting. A reference line grid is scribed on the painting support board more accurately draw and observe straight lines. A continuous loop strip of a hook and loop system placed on all four sides of the support board. A mahl stick with a hook patch of the hook and loop system placed on a tip of the mahl stick allows the artist to attach the mahl stick anywhere on the support board to the loop strip to steady and support the hand while painting.

16 Claims, 10 Drawing Sheets

(56) References Cited

U.S. PATENT DOCUMENTS

| | | | | |
|---|---|---|---|---|
| 3,797,135 | A * | 3/1974 | Linker | G09B 29/001 190/16 |
| 3,926,398 | A * | 12/1975 | Vincent | A47B 97/08 248/448 |
| 3,972,133 | A * | 8/1976 | Parshall | B43L 15/00 248/118 |
| 4,082,452 | A * | 4/1978 | Becker | G03B 27/326 355/74 |
| 4,088,290 | A * | 5/1978 | Novello | B43L 15/00 248/118 |
| 4,093,326 | A * | 6/1978 | Ford | A47B 97/08 248/461 |
| 4,148,506 | A * | 4/1979 | Lamb | B43L 5/02 269/254 D |
| 4,188,006 | A * | 2/1980 | Karlin | B43L 15/00 248/118.3 |
| 4,318,471 | A * | 3/1982 | Hutton | A47B 97/08 206/214 |
| 4,537,380 | A * | 8/1985 | Erickson | B44C 1/00 248/460 |
| 4,605,246 | A * | 8/1986 | Haas | B42F 9/001 248/444 |
| 4,683,836 | A * | 8/1987 | West | B05B 15/08 118/305 |
| 4,685,644 | A * | 8/1987 | Yates | B44D 7/00 248/118.3 |
| 4,717,109 | A | 1/1988 | Johnston | |
| 5,141,198 | A * | 8/1992 | Hoyt | B43L 15/00 248/441.1 |
| 5,154,391 | A * | 10/1992 | Hegarty | B41J 29/15 248/205.2 |
| 5,172,883 | A * | 12/1992 | Amirian | A47B 97/04 248/118 |
| 5,193,772 | A * | 3/1993 | Johnston | B43L 15/00 248/118.5 |
| 5,494,251 | A * | 2/1996 | Katz | A47B 97/04 248/448 |
| 5,882,070 | A * | 3/1999 | Genn | A47B 97/04 248/461 |
| 6,213,439 | B1 * | 4/2001 | Giulie | A47B 97/04 248/459 |
| 6,565,059 | B1 * | 5/2003 | Falconer | A47B 97/00 248/118.3 |
| 6,568,938 | B1 * | 5/2003 | Prince | G09B 11/06 434/85 |
| 6,579,099 | B1 * | 6/2003 | Pipes, Jr. | G09B 11/04 33/1 K |
| 6,772,987 | B2 * | 8/2004 | Jones, II | A47B 97/08 248/441.1 |
| 7,377,476 | B2 | 5/2008 | Almond et al. | |
| 7,401,410 | B1 | 7/2008 | Jewell | |
| 7,513,773 | B1 * | 4/2009 | Oakes | G09B 11/00 434/91 |
| 7,694,806 | B2 | 4/2010 | Huggins | |
| 7,694,931 | B2 * | 4/2010 | Mantelli | G09B 11/02 248/118.3 |
| 7,717,393 | B2 * | 5/2010 | Edgmon | A47B 97/08 206/1.7 |
| 7,926,188 | B2 | 4/2011 | Thorkelson | |
| 2001/0048059 | A1 * | 12/2001 | Jones, II | A47B 97/08 248/461 |
| 2004/0007651 | A1 * | 1/2004 | Williams | F16M 11/04 248/346.06 |
| 2012/0080580 | A1 * | 4/2012 | Densberger | A47B 97/04 248/448 |
| 2013/0065201 | A1 * | 3/2013 | Pool | G09B 19/00 434/98 |

OTHER PUBLICATIONS

Thor International PTE Ltd, Singapore 408564, Fastener Product Website, Found Jun. 5, 2015 at www.thorintl.com/Ensat-Self-Tapping-Inserts.shtml.

Specialty Fasteners & Components Ltd, Devon, TQ9 5AL, England, Product Website, Found Jun. 5, 2015 at www.specialty-fasteners.co.uk.

Yardley Products Corporation, 10 West College Avenue, Yardley, PA 19067-8357, Found Jul. 8, 2015 at: www.yardleyproducts.com.

* cited by examiner

PAINTING SUPPORT BOARD

This application claims priority under 35 U.S.C. §121 and 37 CFR §1.78 as a divisional application of U.S. patent application Ser. No. 14/488,320, filed Sep. 17, 2014, which claims priority under 35 U.S.C. §120 and 37 CFR §1.78 as a continuation-in-part to U.S. patent application Ser. No. 13/956,682, filed Aug. 1, 2013, which in turn claims priority under 35 U.S.C. §119 to U.S. Provisional Patent Application Ser. No. 61/717,954, filed on Oct. 24, 2012, both of which are herein incorporated by reference in their entirety.

TECHNICAL FIELD

This disclosure relates generally to a device for retaining a painting or drawing canvas or panel used by an artist. More particularly, the disclosure relates to a support device for securing a painting or drawing canvas or panel and temporarily securing a mahl stick to the support device while allowing unlimited adjustment of the mahl stick.

BACKGROUND

As is known in the art, "En plein air" is a French expression that means "in the open air," and is particularly used to describe the act of painting outdoors. The "pochade box" or sketch box was developed for use by artists to carry their supplies for painting and sketching in the "open air" using the natural light. The "All In One Pochade Box" from Sienna Plein Air, Craftech International Inc. Huntington Beach, Calif. 92648, provides a pochade box designed to carry all the essentials for a day of plein air painting. The pochade box has three large storage compartments as well as a wet panel storage compartment that allows you to carry two 9×12 or two 8×10 painting panels.

U.S. Pat. No. 7,694,806 (Huggins) describes an artist's paint box. The paint box has a combination hinged easel and cover and storage compartment having a hinged cover. A removable palette mates within the box and has opposing cutouts substantially parallel to each other and another cutout transverse to the opposing cutouts. The opposing cutouts and the transverse cutout form a substantially U shape. A recessed paint color mixing area is formed between and adjacent the opposing cutouts and adjacent the transverse cutout. A recessed paintbrush and tool holding area is adjacent the transverse cutout and opposing the recessed paint color mixing area. Paint wells are placed within the opposing cutouts and the transverse cutout. Each of the paint wells has opposing side ridges resting on opposing edges adjacent each of the opposing cutouts and other opposing edges adjacent the transverse cutout.

Further, as is known in the art, a mahl stick is a stick or thin pole about a meter in length (three feet) with a ball-shape pad at one end, used as an aid in painting, particularly in oil painting. A mahl stick is useful when painting detail or when painting in a large area where the paint is still wet to avoid touching the surface accidentally. The ball-end of the mahl stick is rested on the edge of the canvas, on the easel, or even on a spot of the painting that's dry. The other end is held up with the artist's non-painting hand and the arm holding the brush is placed on the stick while painting.

The artist paint box or the pochade box of the prior forces the artist to handle wet canvases as they are placed in the box for transport, thus allowing the wet painting to accidentally be touched when being moved. Further the pochade box or a paint box does not provide a region for steadying a mahl stick.

SUMMARY

An object of this disclosure is to provide a support device for holding artist canvases and panels on which an artist may work.

In order to accomplish at least this object, an artist canvas or panel support system has a rectangular painting support board formed of a rigid material having a length and a width for accommodating a largest of the artist's wherein each of the artist's canvas or panel has a length, a width, and a thickness that is differs from the other artist's canvas or panels. A coating is applied to the painting support board of a color such that the painting support board mimics the color of a frame onto which the artist's canvas or panel may be mounted.

The painting support board has equally spaced lines placed on the surface of the painting support board to form a grid such that the artist is able to use the grid to approximate straight lines during painting, sketching or drawing and to gauge distance within a scene being painted, sketched or drawn during the painting, sketching, or drawing. A loop strip of a hook and loop fastener system adhered near the periphery of the painting support board. An opening in the rectangular painting support board is formed to allow a person to carry the rectangular painting support board.

A mahl stick temporarily attaches to the painting support board with the loop strip for aiding in detail or painting in a large area of the artist's canvas or panel when the paint is still wet for avoiding touching the surface accidentally. The mahl stick is formed of an elongated stick of a length and thickness and of a substance for providing support for an artist's arm and brush while painting, sketching or drawing. A hook strip of the hook and loop system is attached at one end of the elongated stick and covering an end tip of the elongated stick.

The painting support board has dimensions of from approximately ¼ inch to approximately ⅝ inch thick by approximately 23 inches wide by approximately 26 inches long. The opening has dimensions of approximately 1.5 inches wide by 4 inches long.

In order to accomplish at least this object, a method for forming an artist canvas or panel support system begins by forming an artist canvas or panel support system. The step of forming the artist canvas or panel support system begins by forming a rectangular painting support board of a rigid material having a length and a width for accommodating a largest of the artist's wherein each of the artist's canvas or panel has a length, a width, and a thickness that differs from the other artist's canvas or panels. A coating is applied to the painting support board of a color such that the painting support board mimics the color of a frame into which the artist's canvases or panels may be mounted. Equally spaced lines are placed on the surface of the painting support board to form a grid such that the artist is able to use the grid to approximate straight lines during painting, sketching or drawing and to gauge distance within a scene being painted, sketched or drawn during the painting, sketching, or drawing. A continuous ½ inch loop strip of a hook and loop fastener system is adhered near the periphery of the painting support board. An opening in the rectangular painting support board is formed to allow a person to carry the rectangular painting support board.

A mahl stick is formed to be temporarily attached to the painting support board with the loop strip for aiding in detail or painting in a large area of the artist's panel when the paint is still wet for avoiding touching the surface accidentally. The mahl stick is formed by fashioning an elongated stick of a length and thickness and of a substance to provide support for an artist's arm and brush while painting, sketching or drawing. A hook strip of a hook and loop system is adhered at one end of the mahl stick to cover an end tip of the mahl stick with the hook strip.

The painting support board has dimensions of from approximately ¼ inch to approximately ⅝ inch thick by approximately 23 inches wide by approximately 26 inches long. The opening has dimensions of approximately 1.5 inches wide by 4 inches long. The rigid material forming the painting support board is cellulose based fiber wallboard, plywood, an engineered wood product constructed of wood fibers assembled with adhesives, fiberglass panels, high density plastic laminated panels (i.e. high density polyethylene), or any rigid panel material.

The mahl stick has dimensions that are approximately 1 inch square and 18 inches long and the hook strip has dimensions of approximately 1 inch by 1 inch. The mahl stick is made of wood.

DETAILED DESCRIPTION

Figure 1:
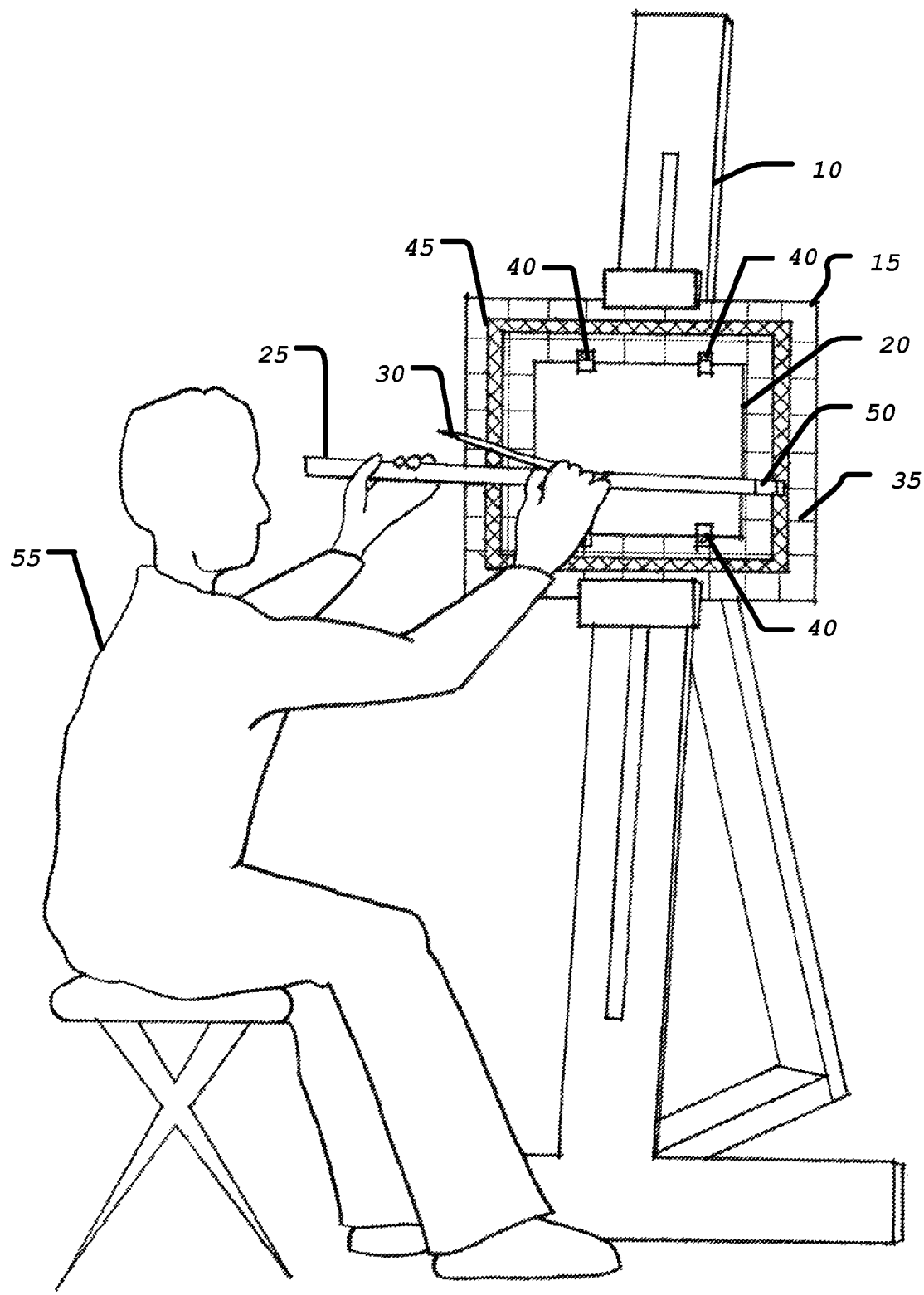
FIG. 1 is an illustration of the painting support board of this disclosure as secured to an easel.
Figure 2:
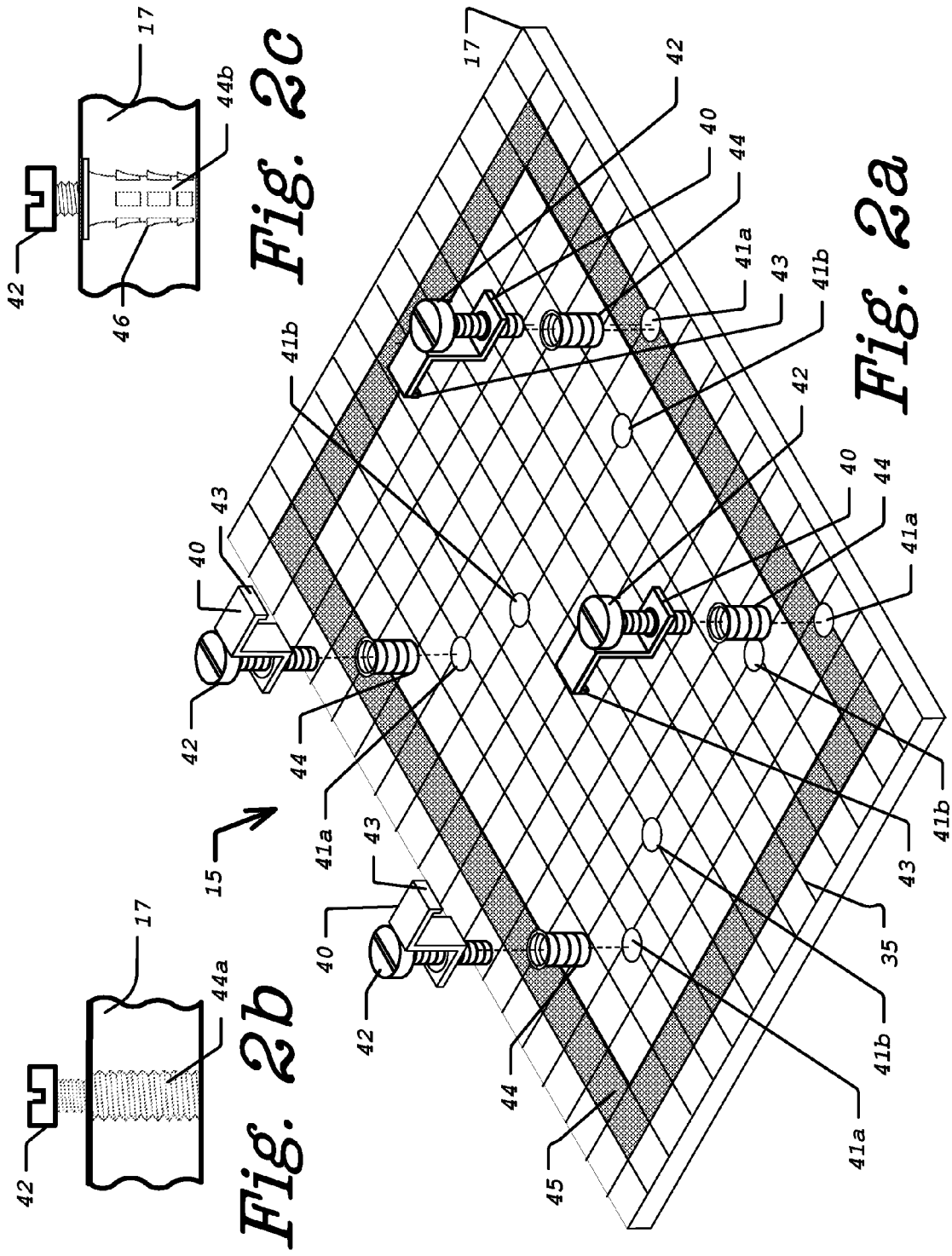
FIG. 2a is an illustration of the painting support board of this disclosure illustrating the panel securing clips embodying the principals of the present disclosure.
FIG. 2b is an illustration of the painting support board of this disclosure illustrating an attached fastener placed in an externally threaded receiving fastener placed in the fastener holes embodying the principals of the present disclosure.
FIG. 2c is an illustration of the painting support board of this disclosure illustrating an attached fastener placed in a press-fit receiving fastener placed in the fastener holes embodying the principals of the present disclosure.
Figure 3:
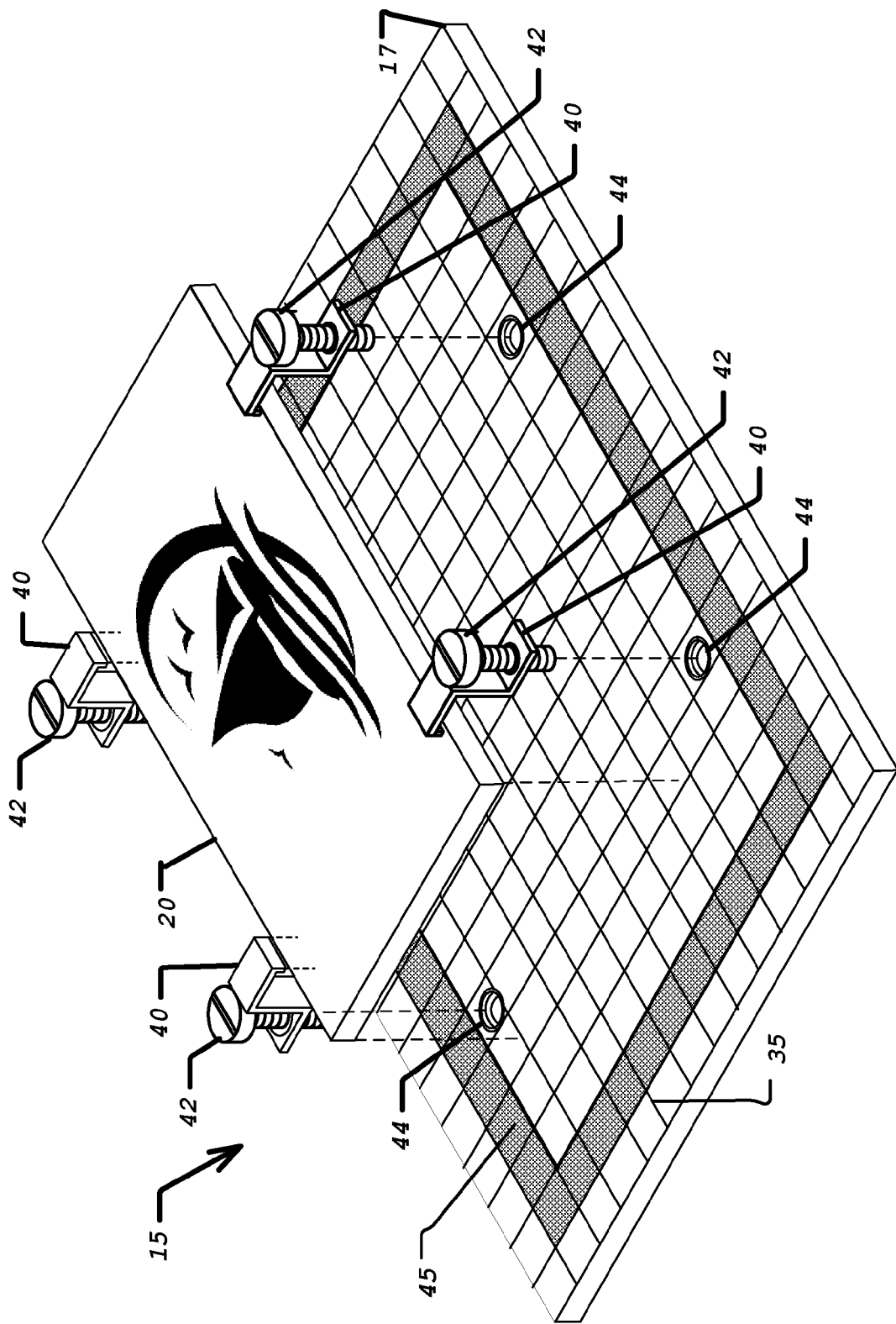
FIG. 3 is an illustration of an exploded view of the painting support board illustrating the mounting of an artist's panel of this disclosure.
Figure 4:
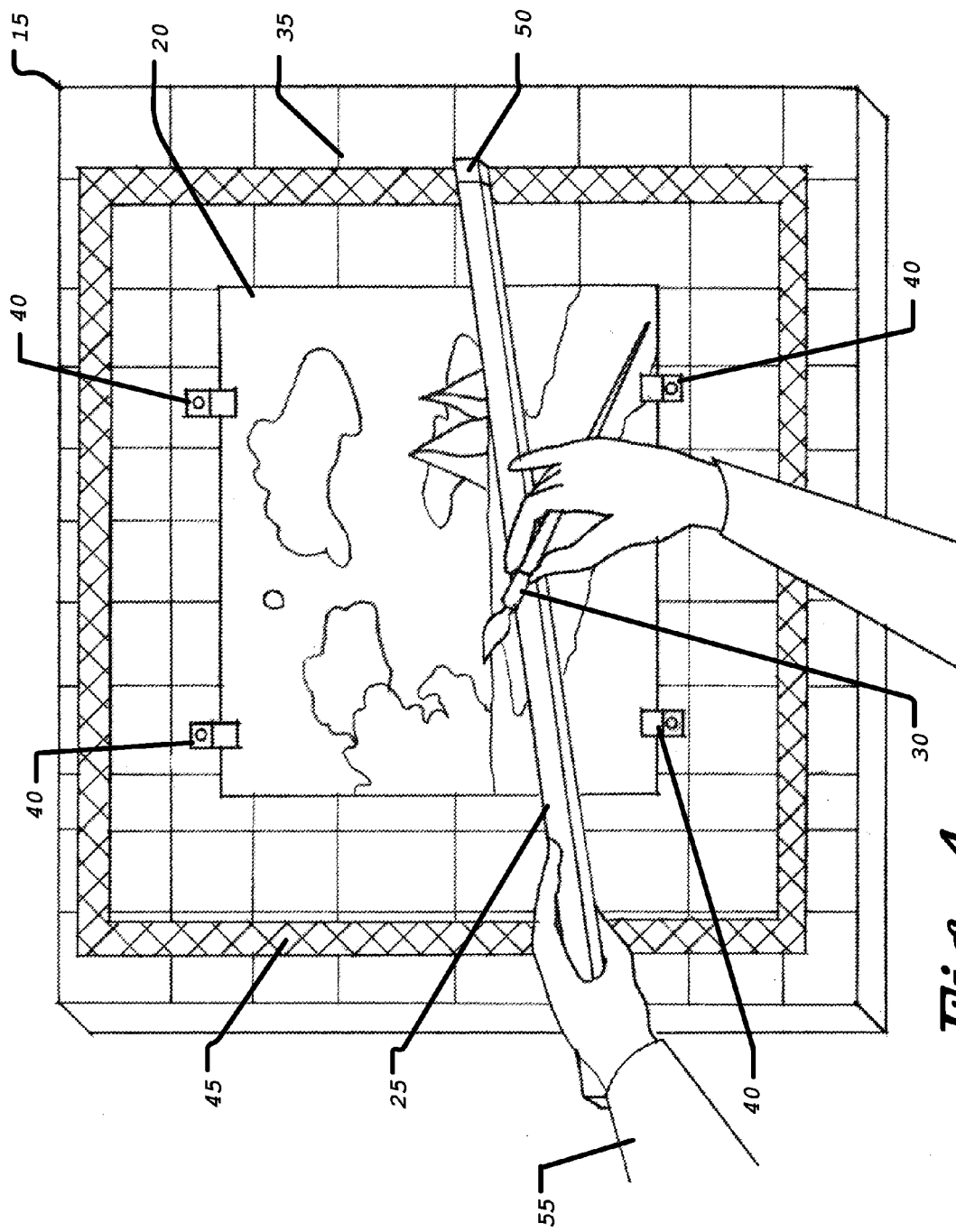
FIG. 4 is a drawing of the painting support board of this disclosure illustrating the use of a mahl stick secured to the painting support board.

FIG. 1 is an illustration of the painting support board 15 of this disclosure as secured to an easel 10. FIG. 2a is an illustration of the painting support board 15 of this disclosure illustrating the panel securing clips 40 embodying the principals of the present disclosure. FIG. 3 is an illustration of an exploded view of the painting support board 15 illustrating the mounting of an artist's panel or canvas 20 of this disclosure. FIG. 4 is a drawing of the painting support board 15 of this disclosure illustrating the use of a mahl stick 25 secured to the painting support board 15. Referring to FIGS. 1-4, the painting support board 15 is a board 17 for holding artist's panels or canvases 20 that are smaller than the painting support board 15. The painting support board 15 then easily sits on the easel 10 or any other platform or simply on the artist's 55 lap. The painting support board 15 isolates the painting canvas or panel 20 from its potentially distracting surroundings. The support board 15 is colored such that the area of the painting support board 15 surrounding the artist's panel or canvas 20 mimics the frame in which the finished painting will sit. There is a reference line grid 35 scribed onto the painting support board 15 used to more accurately draw and observe straight lines. There is a continuous loop strip 45 of a hook and loop system on all four sides of the painting support board 15.

A hand held mahl stick 25 with hook patch 50 of the hook and loop system placed on a tip of the mahl stick 25 that allows the artist 55 to attach the mahl stick 25 anywhere on the painting support board 15 to the continuous loop strip 45 to steady and support the hand while painting. The hook and loop system for the mahl stick 25 allows infinite adjustment of the mahl stick 25 relative to the canvas or panel 20 while painting. The mahl stick 25 and the painting support board's grid 35 also assists in painting straight lines and the edges of perpendicular and other straight edged objects within the canvas or panel 20 while painting.

Fastener holes 41a and 41b are placed at fixed locations on the support board 15 such that the locations of the fastener holes allow attaching several different sizes of the paint canvases and panels 20. The painting support board 15 also serves as a convenient and tidy way to transport the paint canvases and panels 15 if used outside or within the studio. The wet paint edges of the canvas or panel 20 will not touch the hands or the area in which it is placed while still attached to the painting support board 15.

The painting support board 15 is a panel or board 17 constructed of cellulose based fiber wallboard, plywood, an engineered wood product constructed of wood fibers assembled with adhesives, fiberglass panels, high density plastic laminated panels (i.e. high density polyethylene), or any other suitable rigid panel material. The board 17 is cut to any convenient size but in various embodiments, the board 17 is approximately ½ inch thick by 15 inches high by 18 inches long. The cellulose based fiber wallboard is a material such as the product manufactured by Homasote Company of West Trenton, N.J. 08628. The painting support board 15 may be any color but preferably shiny gold or silver to mimic the color of a potential frame for a painting or other artistic work placed on the canvas or panel 20. There are reference grid lines 35 of any spacing increment scribed on the painting support board 15. In various embodiments, the reference grid lines 35 have a spacing of one inch increments forming a square line grid over the whole surface of the painting support board 15.

Drilled fastener holes 41a and 41b for accepting receiving fasteners 44 are place in specified fixed locations in the surface of the painting support board 15 such that two panel securing clips 40 are placed at a first side (i.e. top) and two panel securing clips 40 are placed at a second side (i.e. bottom) of the painting support board 15. In various embodiments, one hole 41a and 41b is 1¾ inches from the bottom and 4 inches from the left side of the board 17. A second hole 41a and 41b is 3½ inches from the bottom and 5 inches from the left side of the board 17. A third hole is 1½ inch from the top and 4 inches from the left side of the board 17. A fourth hole is 2½ inches from the top and 5 inches from the left side of the board 17. A fifth hole is 1½ inches from the top and 4½ inches from the right. A sixth hole is 2½ inches from the top and 5½ inches from the right side of the board 17. A seventh hole is 3½ inches from the bottom and 4½ inches from the right side of the board 17. An eighth hole is 1½ inches from the bottom and 4½ inches from the right side of the board 17. The locations of the fastener holes 41a and 41b are placed in the painting support board 15 to ensure that a minimum amount of the painting canvas or panel 20 is contacted to secure the painting canvas or panel 20 to the painting support board 15.

FIG. 2b is an illustration of the painting support board 15 illustrating an attached fastener 42 placed in an externally threaded receiving fastener 44a placed in the fastener holes 41a and 41b embodying the principals of the present disclosure. FIG. 2c is an illustration of the painting support board 15 illustrating an attached fastener 42 placed in a press-fit receiving fastener 44c placed in the fastener holes 41a and 41b embodying the principals of the present disclosure. Referring to FIG. 2a, once the fastener holes 41a and 41b are placed in the painting support board 15, one receiving fastener 44 is placed in each of the fastener holes 41a and 41b and secured to retain the painting canvas or panel to the support board 15. The receiving fastener 44 of FIG. 2a may be an externally threaded receiving fastener 44a as shown in FIG. 2b. The externally threaded receiving fastener 44a is threaded into the fastener holes 41a and 41b and the attached fastener 42 is place in the opening of the externally threaded receiving fastener 44a to mate with the internal threads. Alternately, the receiving fastener 44 of FIG. 2a may be a press-fit receiving fastener 44b as shown in FIG. 2c. The press-fit receiving fastener 44b is forcefully placed into the fastener holes 41a and 41b such that the curved hooks 46 lock firmly into the sidewalls of the fastener holes 41a and 41b to secure the receiving press-fit receiving fastener 44b. A panel securing clip 40 with an attached fastener 42 is placed in each of the receiving fasteners 44 placed in the fastener holes 41a and 41b and secured to retain the painting canvas or panel to the support board. The fastener holes 41a are arranged for securing a canvas or panel 20 of a first set of dimensions and the fastener holes 41b are arranged for securing a canvas or panel 20 of a second set of dimensions.

The receiving fastener 44 is internally threaded to accept a threaded fastener 42 attached to the panel securing clip 40 for securing the panel securing clip 40 to the painting support board 15. The receiving fastener 44 is externally threaded for securing the threaded receiving fastener 44 to the painting support board 15. Alternatively, the threaded receiving fastener 44 is press fit into the painting support board 15 for securing the receiving fastener 44 using friction of the interface between the threaded receiving fastener and the painting support board. As is known in the art, numerous companies such as Thor International Pte Ltd., Singapore 408564 provide various fasteners having internal and external threads and press fit fasteners having internal threading. Similarly, Specialty Fasteners & Components LTD, Devon, TQ9 5AL, England provides various cam lock fasteners mating with a locking structure suitable for being the attached fastener 43 mating to the receiving fastener 44 in one the holes 41a and 41b.

The panel securing clip 40 has a Z-shaped holding element, with one leg of the Z-shaped holding element having a hole placed for retaining the attached fastener 42 that is inserted in the receiving fastener 44. The securing leg of the Z-shaped holding element of the panel securing clip 40 has a small extended member 43 perpendicular to the securing leg to apply a minimal surface area to the painting canvas or panel 15.

The attached fastener 42 attached to the panel securing clip 40 is, in various embodiments, a threaded fastener such as a screws or bolt. In other embodiments, the fastener is a cam lock fastener mating with a locking structure in the receiving fastener 44 in one the holes 41a and 41b. Any type of locking or securing fastener suitable providing sufficient pressure to the panel securing clip 40 to hold the painting canvas or panel 15 are in keeping with the intent of this disclosure.

The length of the attached fasteners 42 connected to the panel securing clips 40 are such that they allow the painting canvas or panel 20 to be mounted to the painting support board 15 and mate with the receiving fasteners 44 to secure the painting canvas or panel 20. In various embodiments, the attached fasteners connected to the panel securing clips 40 are approximately 1 inch long and approximately ½ inch in diameter. The receiving fasteners 44 in the fastener holes have a length sufficient for securing to the support board 17.

The securing leg of the Z-shaped holding element of the panel securing clip 40 are of various lengths, for example ⅟16", ⅛", ¼", ⅜", ½", ¾" and 1 inch increments for securing the painting canvas or panel 20 to the support board 15. The painting canvas or panel 20 may be of any dimension, however the locations of the fastener holes 41a and 41b are placed such that standard dimensions of canvas panels 20 are used with one of the panel securing clips 40 with an appropriate length of the securing leg of the panel securing clip 40.

Loop strips 45 of the hook and loop system are attached to the board 17 preferably as a continuous ½ inch strip indented ½ inch from the edge along all four sides of the support board 15. The loop strips 45 provide an attachment area to hold the mahl stick 25 during painting. The loop strips 45 are adhered to the support board 17 such that they are replaceable when the loop strips 45 have lost their adhesion properties during use.

The accompanying mahl stick 25 has a hook patch 50 adhered to the mahl stick 25. The mahl stick 25 may be of any suitable dimension or material (wood being preferable). The preferable dimensions are approximately 1 inch square and 18 inches long with a 1 inch by 1 inch hook strip 50 on all four sides of one end and covering the end tip of the mahl stick 25.

Figure 5:
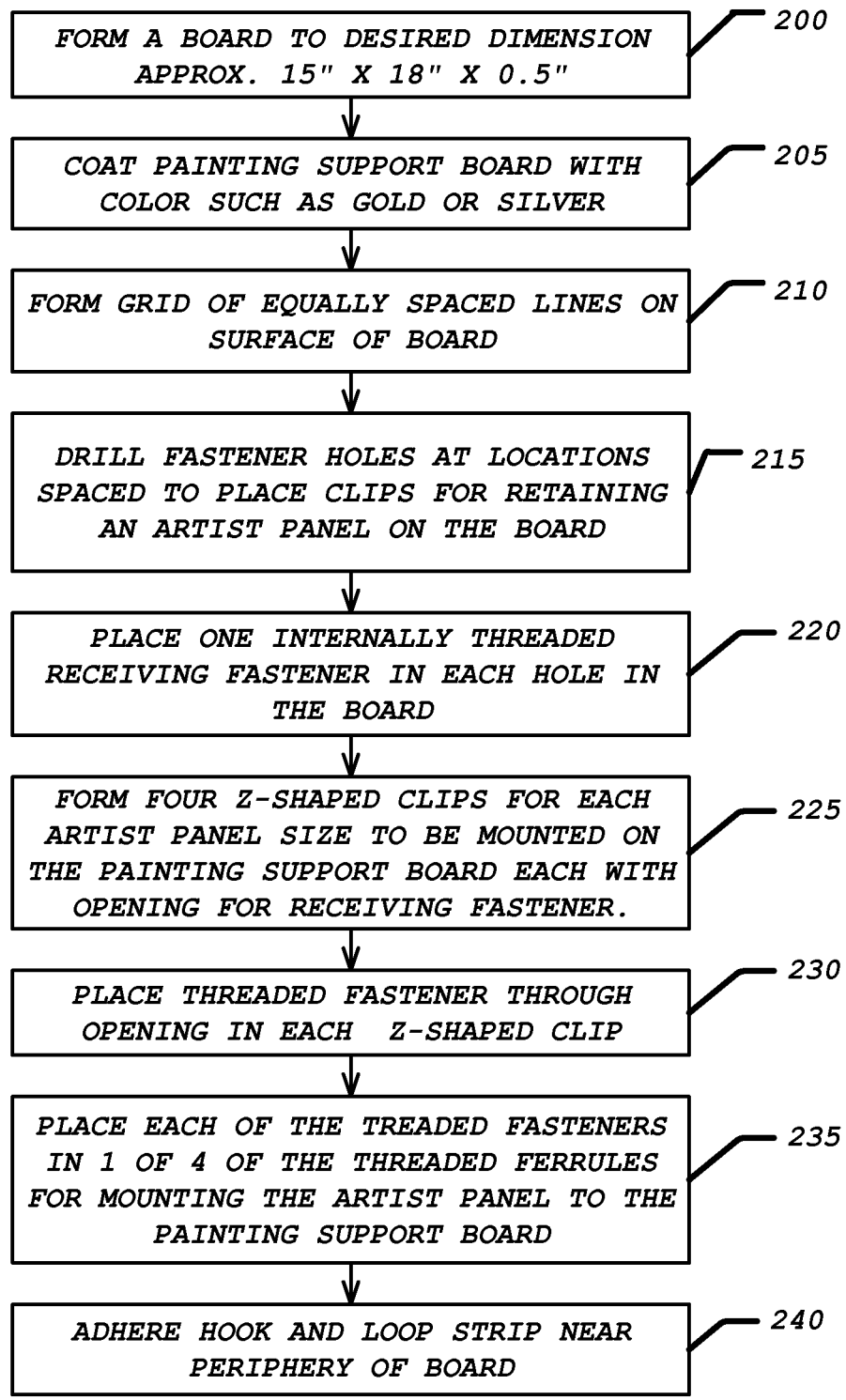
FIG. 5 is a flowchart illustrating a method for forming a painting support board.

FIG. 5 is a flowchart illustrating a method for forming a painting support board 15. Referring to FIGS. 2, 3, and 5, a rigid board 17 is formed (Box 200) to any desired dimensions. In various embodiments, the board 17 is formed (Box 200) to approximately 15"×18"×0.5". The board 17 is coated (Box 205) with a colored material such as a paint having a color such that the board 17 will mimic the structure of a frame in which the painting may be mounted. The colored material is commonly a shiny gold or silver material.

Reference grid lines 35 of any equal spacing increment are formed (Box 210) on the board 17. In various embodiments, the reference grid lines 35 have a spacing of one inch increments forming a square line grid over the whole surface of the board 17.

Fastener holes 41a and 41b are drilled (Box 215) in the surface of the board 17 at locations to place panel securing clips 40 at a first side (i.e. top) and two at a second side (i.e. bottom) of the board 17. In various embodiments, one hole 41a and 41b is 1¾ inches from the bottom and 4 inches from the left side of the board 17. A second hole 41a and 41b is 3½ inches from the bottom and 5 inches from the left side of the board 17. A third hole is 1½ inch from the top and 4 inches from the left side of the board 17. A fourth hole is 2½ inches from the top and 5 inches from the left side for locating a first artist's canvas or panel 20. A fifth hole is 1½ inches from the top and 4½ inches from the right. A sixth hole is 2½ inches from the top and 5½ inches from the right side of the board 17. A seventh hole is 3½ inches from the bottom and 4½ inches from the right side of the board 17. An eighth hole is 1½ inches from the bottom and 4½ inches from the right side for locating a second sized artist's canvas or panel 20. The locations of the fastener holes 41a and 41b are placed in the painting support board 15 to ensure that a minimum amount of the painting canvas or panel 20 is contacted to secure the painting canvas or panel 20 to the painting support board 15.

Once the fastener holes 41a and 41b are placed in the painting support board 15, one threaded receiving fastener 44 is placed (Box 220) in each of the fastener holes 41a and 41b.

The panel securing clip 40 is formed (Box 225) with a Z-shaped holding element. One leg of the Z-shaped holding element is drilled to have a hole placed for accepting and retaining (Box 230) the attached fastener 42. The attached fastener 42 is inserted (Box 235) in the receiving fastener 44 in one of the fastener holes 41a and 41b. The securing leg of the Z-shaped holding element of the panel securing clip 40 has small extended member 43 perpendicular to the securing leg to apply a minimal surface area to the painting canvas or panel 15.

Loop strips 45 of a hook and loop system are attached (Box 240) to the board 17 preferably as a continuous ½ inch strip indented ½ inch from the edge along all four sides of the support board 15. The loop strips 45 provide an attachment area to hold a mahl stick 25 during painting. The loop strips 45 are adhered to the support board 17 such that they are replaceable when the loop strips 45 have lost their adhesion properties during use.

An accompanying mahl stick 25 is provided with a hook patches 50 adhered to the mahl stick 25. The mahl stick 25 formed to any suitable dimension or material (wood being preferable). The preferable dimensions are approximately 1 inch square and 18 inches long with a 1 inch by 1 inch hook strip 50 on all four sides of one end and covering the end tip of the mahl stick 25.

Figure 6:
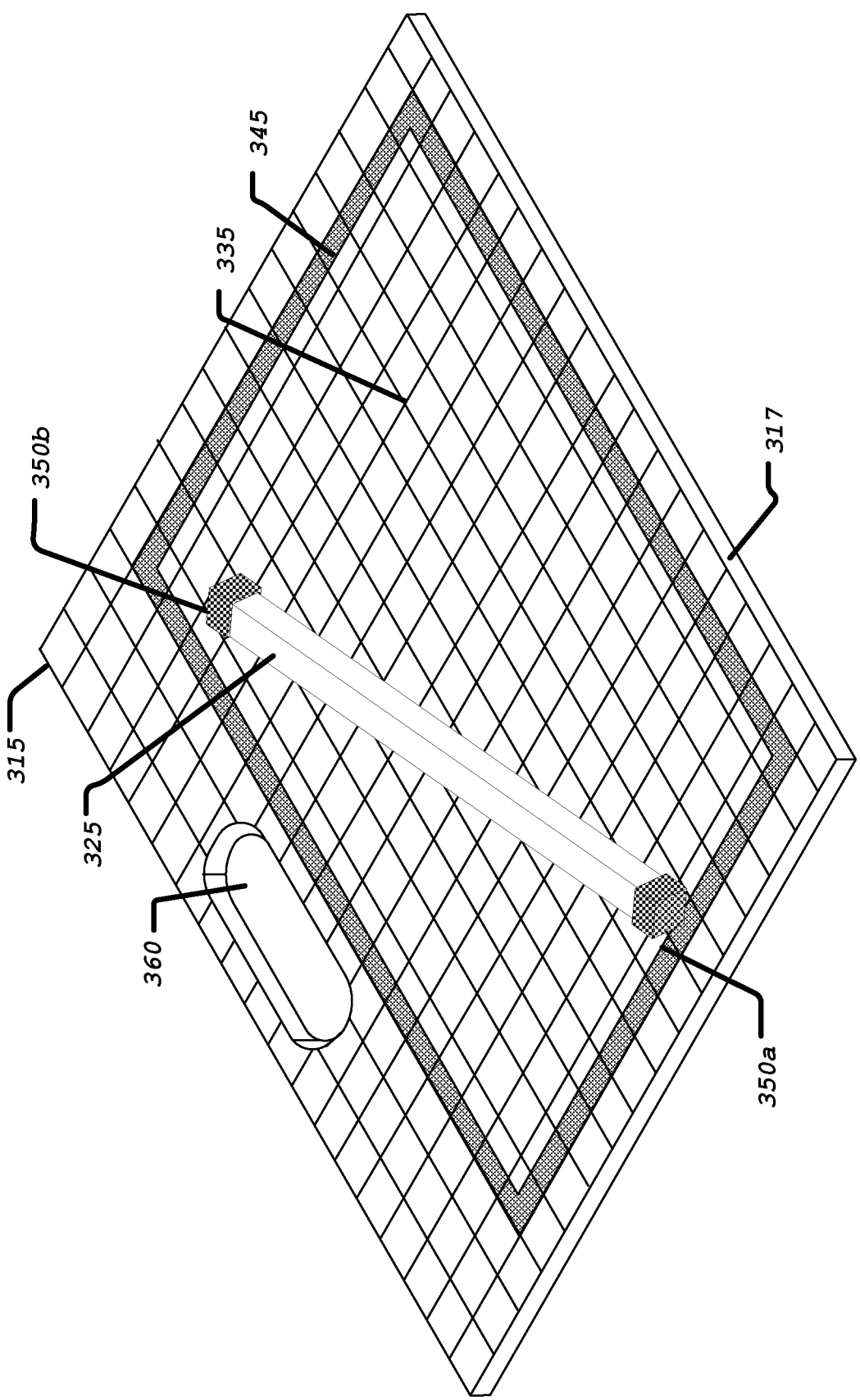
FIG. 6 is an illustration of artist canvas or panel support system of this disclosure illustrating the use of a mahl stick secured to the painting support board.

FIG. 6 is an illustration of the painting support board 315 of this disclosure illustrating the use of a mahl stick 325 secured to the painting support board 315 of this disclosure. As described above for FIGS. 1-6, the support board 315 is colored such that the area of the support board 315 surrounding the panel 20 mimics the frame in which the finished painting will sit. There is a reference line grid 335 scribed onto the painting support board 315 used to more accurately draw and observe straight lines. There is a continuous loop strip 345 of a hook and loop system on all four sides of the painting support board 315.

A hand held mahl stick 325 with two hook patches 350a and 350b of the hook and loop system are placed on each end tip of the mahl stick 325 that allows the artist 55 of FIG. 1 to attach the mahl stick 325 anywhere on the support board 315 to the continuous loop strip 345 to steady and support the hand while painting. The hook and loop system for the mahl stick 325 allows infinite adjustment of the mahl stick 25 relative to the canvas or panel held fast to the painting support board 315 while painting. The mahl stick 325 and the support board's grid 335 also assists in painting straight lines and the edges of perpendicular and other straight edged objects within the canvas or panel 20 while painting.

The painting support board 315 is a panel or board 317 constructed of cellulose based fiber wallboard, plywood, an engineered wood product constructed of wood fibers assembled with adhesives, fiberglass panels, high density plastic laminated panels (i.e. high density polyethylene), or any other suitable rigid panel material. The board 37 is cut to any convenient size but in various embodiments, the board 317 is from approximately ¼ inch to approximately ⅝ inch thick by approximately 23 inches wide by approximately 26 inches long. The cellulose based fiber wallboard is a material such as the product manufactured by Homasote Company of West Trenton, N.J. 08628. The painting support board 315 may have a coating applied to its surface of any color but preferably shiny gold or silver to mimic the color of a potential frame for a painting or other artistic work placed on a panel. Alternately, the structure of the embodiment of FIG. 6 is suitable for holding a pad of artist or drawing paper that is secured to the painting support board 315 with a spring clamping device or binder clip (not shown) such as illustrated in U.S. Pat. No. 1,139,627 (Baltzley). The spring clamping device is not permanently attached to the painting support board 315 in various embodiments. In other embodiments, one skilled in the art would understand that a spring clamping device could be envisioned that would be attached to the painting support board 315 having a structure similar to that of the panel securing clip 40 of FIG. 2.

There are reference grid lines 335 of any spacing increment scribed on the painting support board 315. In various embodiments, the reference grid lines 335 have a spacing of one inch increments forming a square line grid over the whole surface of the painting support board 315.

Loop strips 345 of the hook and loop system are attached to the board 317 preferably as a continuous ½ inch strip indented ½ inch from the edge along all four sides of the painting support board 315. The loop strips 345 provide an attachment area to hold the mahl stick 325 during painting when the hook pads 350a or 350b contact a loop strip of the loop strips 345. The loop strips 345 are adhered to the support board 17 such that they are replaceable when the loop strips 45 have lost their adhesive properties during use.

The accompanying mahl stick 325 has hook patches 350a and 350b adhered to the ends of the mahl stick 325. The mahl stick 325 may be of any suitable dimension or material (wood being preferable). The preferable dimensions are approximately 1 inch square and 18 inches long with a 1 inch by 1 inch hook strip 350a and 350b on all four sides of each end and covering the end tip of the mahl stick 325.

An opening 360 is formed in the board of the 317 to allow a person to carry the painting support board 315. In some embodiments, the opening 360 has dimensions of approximately 1.5 inches wide by 4 inches long. In other embodiments, a separate handle is attached to the rear surface of the painting support board 315.

Figure 7:
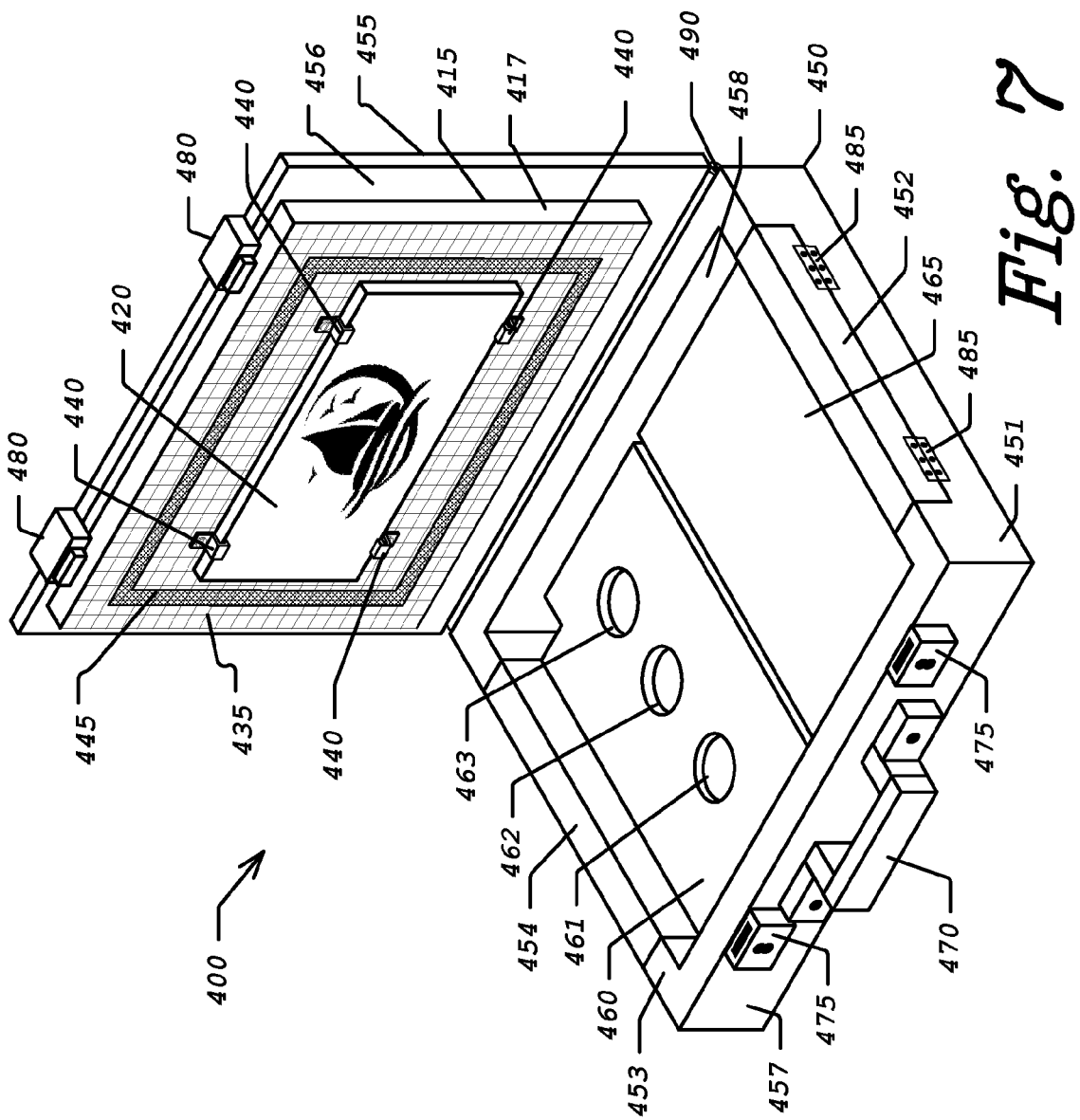
FIG. 7 is an illustration of a plein air pochade box including a painting support board embodying the principles of this disclosure.
Figure 8:
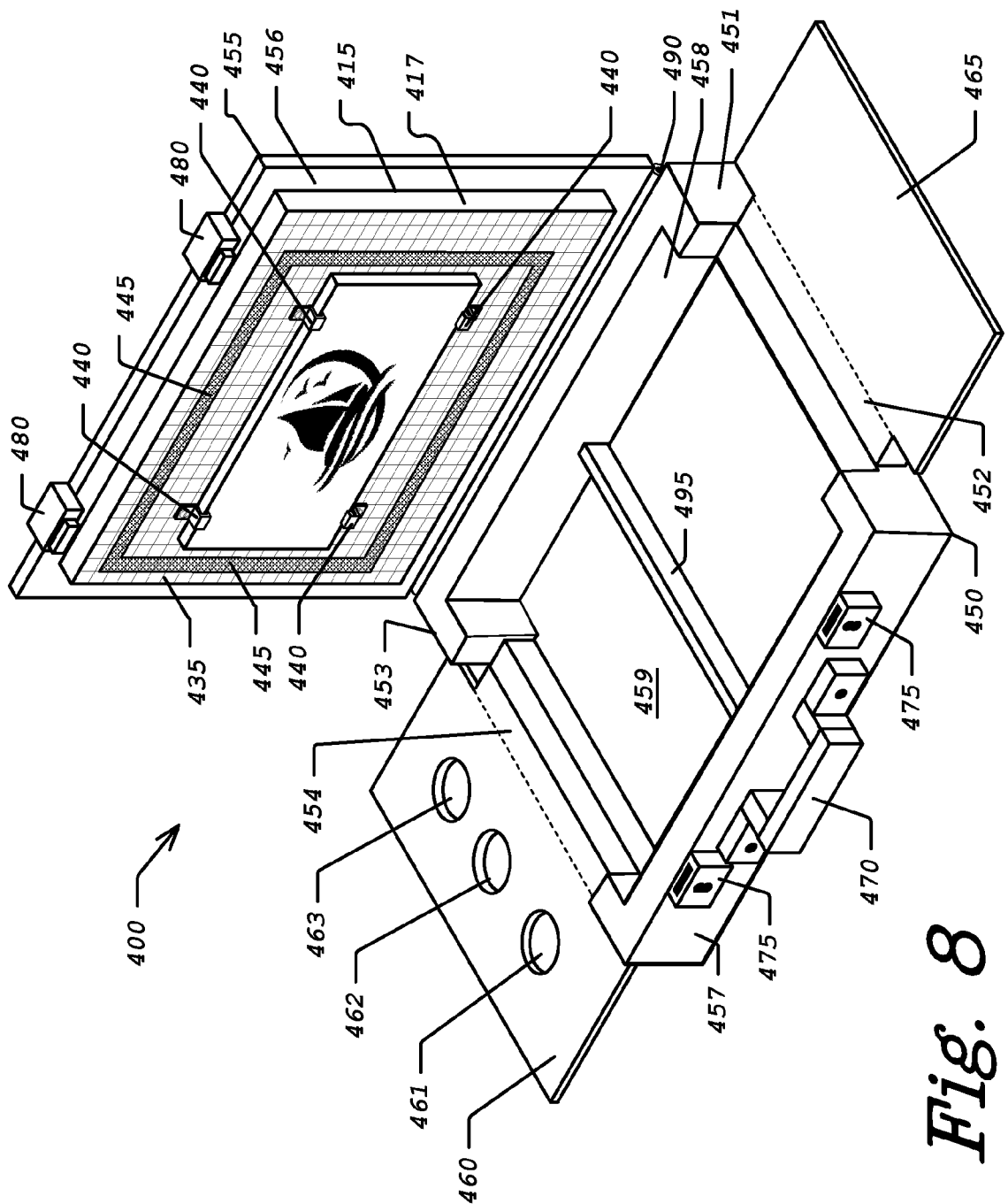
FIG. 8 is an illustration of a completely opened plein air pochade box including a painting support board embodying the principles of this disclosure.
Figure 9:
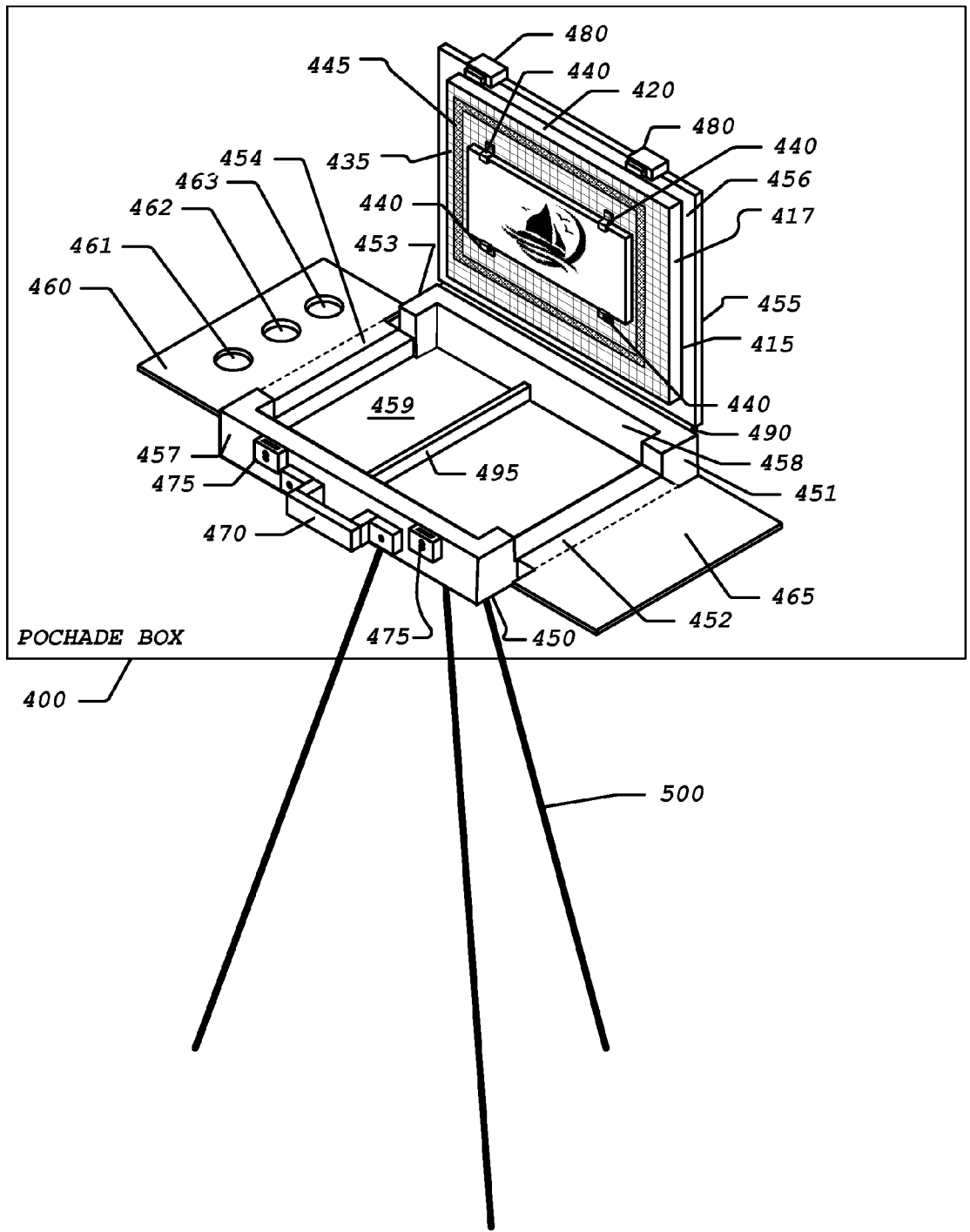
FIG. 9 is an illustration of a completely opened plein air pochade box including a painting support board supported by tripod embodying the principles of this disclosure.

FIG. 7 is an illustration of a plein air pochade box 400 including a painting support board 420. FIG. 8 is an illustration of a completely opened plein air pochade box 400 including a painting support board 420. FIG. 9 is an illustration of a completely opened plein air pochade box 400 including a painting support board 420 supported by tripod 500. Pochade is a French word meaning a small painted sketch that is derived from a 19th Century French verb, pocher, meaning to sketch. Thus, as is known in the art, a pochade box is a portable painting box with a built in easel, meant to facilitate the creation of small paintings or sketches. The pochade box should not be confused with a simple painting box, which holds painting supplies and a wooden palette, but has no provision for acting as an easel.

Referring to FIGS. 7, 8, and 9, a pochade box 400 embodying the principles of this disclosure is rectangular in shape and includes a lid section 455 connected with a hinge 490 to a body section 450. A carrying handle 470 and a pair of lock receivers 475 are attached to a front wall 457 of the body section 450. The body section 450 has a two side walls 451 and 453. A channel is cut into each of the two side walls 451 and 453. A block 452 is connected by hinges 485 to the side wall 451 and a block 454 is connected by hinges (not shown) to the side wall 453. A shelf panel 460 is attached to the block 454 such that it may be folded out of the body section 450 (FIGS. 8 and 9). Similarly, a shelf panel 465 is attached to the block 452 such that it may be folded outward from the body section 450 (FIGS. 8 and 9). The shelf panel 460 is shown having holes 461, 462, and 463 made in its surface. The holes 461, 462, and 463 are used for holding painting tools such as brushes, palette knives, etc. Either one or both of the shelf panels 460 and 465 may have the holes 461, 462, and 463. The two shelf panels 460 and 465 when folded into the body section 450 rest on a block 495. The block 495 fastened to the bottom panel 459, the front wall 457 and the rear wall 456 of the body section 450. The block 495 may be secured with mechanical fasteners or adhesives using techniques known in the art.

The lid section 455 is fastened to the body section 450 of the pochade box 400 with the hinge 490. A painting support board 415 is affixed to an inside surface 456 of the lid section 455 by mechanical fasteners (screws, rivets, or nuts and bolts) or by an adhesive that securely mounts the artist's support board 415 to the lid section 455. The painting support board 415 has dimensions such that it fits within the interior of the body section 450 when the lid section 455 is closed to the body section 450. Locking latches 480 are affixed to the lid and aligned such that when the lid section 455 is closed, the locking latches 480 are aligned with the body lock receivers 475 for securing the lid section 455 to the body section 450.

As described in FIGS. 2 and 3 the painting support board 415 is a board 417 for holding artist's panels or canvases 420 that are smaller than the painting support board 415. The painting support board 415 isolates the painting canvas or panel 20 from its potentially distracting surroundings. The support board 415 is colored such that the area of the support board 415 surrounding the panel 420 mimics the frame in which the finished painting will sit. There is a reference line grid 435 scribed onto the painting support board 415 used to more accurately draw and observe straight lines. There is a continuous loop strip 445 of a hook and loop system on all four sides of the painting support board 415.

As shown in FIGS. 1 and 4, a hand held mahl stick 25 with hook patch 50 of the hook and loop system placed on a tip of the mahl stick 25 that allows the artist 55 to attach the mahl stick 25 anywhere on the support board 415 to the continuous loop strip 445 to steady and support the hand while painting. The hook and loop system for the mahl stick 25 allows infinite adjustment of the mahl stick 25 relative to the canvas or panel 420 while painting. The mahl stick 25 and the support board's grid 435 also assists in painting straight lines and the edges of perpendicular and other straight edged objects within the canvas or panel 420 while painting. The continuous loop strip 445 may be placed at any location on the painting support board 415

As shown in FIGS. 2 and 3, fastener holes are placed at fixed locations on the support board 415 such that the locations of the fastener holes allow attaching several different sizes of the paint canvases and panels 420.

The painting support board 415 is a panel or board 417 constructed of cellulose based fiber wallboard, plywood, an engineered wood product constructed of wood fibers assembled with adhesives, fiberglass panels, high density plastic laminated panels (i.e. high density polyethylene), or any other suitable rigid panel material. The board 417 is cut to fit within the body section 450 of pochade box 400 when the lid 455 is closed. The painting support board 415 may be any color but preferably shiny gold or silver to mimic the color of a potential frame for a painting or other artistic work placed on the canvas or panel 420. There are reference grid lines 435 of any spacing increment scribed on the painting support board 415. In various embodiments, the reference grid lines 435 have a spacing of one inch increments forming a square line grid over the whole surface of the painting support board 415.

Drilled fastener holes for accepting receiving fasteners are place in specified fixed locations in the surface of the painting support board 415 such that two panel securing clips 440 are placed at a first side (i.e. top) and two panel securing clips 440 are placed at a second side (i.e. bottom) of the painting support board 415. As described above, the locations of the fastener holes are placed in the painting support board 415 to ensure that a minimum amount of the painting canvas or panel 420 is contacted to secure the painting canvas or panel 420 to the painting support board 415.

Once the fastener holes are placed in the painting support board 415, one receiving fastener is placed in each of the fastener holes. A panel securing clip 440 with an attached fastener is placed in each of the receiving fasteners placed in the fastener holes and secured to retain the painting canvas or panel to the support board. The fastener holes are arranged for securing a canvas or panel 420 of a first set of dimensions and the fastener holes are arranged for securing a canvas or panel 420 of a second set of dimensions.

The panel securing clip 440 has a Z-shaped holding element, with one leg of the Z-shaped holding element having a hole placed for retaining the attached fastener that is inserted in the receiving fastener. The securing leg of the Z-shaped holding element of the panel securing clip 440 has a small extended member perpendicular to the securing leg to apply a minimal surface area to the painting canvas or panel 420.

The attached fastener joined to the panel securing clip 440 is, in various embodiments, a threaded fastener such as a screws or bolt. In other embodiments, the fastener is a cam lock fastener mating with a locking structure in the receiving fastener in one the holes. Any type of locking or securing fastener suitable providing sufficient pressure to the panel securing clip 440 to hold the painting canvas or panel 420 are in keeping with the intent of this disclosure.

The dimensions of the attached fasteners connected to the panel securing clips 440 are such that they allow the painting canvas or panel 420 to be mounted to the painting support board 415 and mate with the receiving fasteners 44 to secure the painting canvas or panel 20, as described above in FIGS. 2 and 3.

In FIG. 9, the pochade box 400 is attached to a tripod 500 for support while an artist working. The tripod 500, in various embodiments, is a standard, commercially available tripod used for cameras, binoculars, and the like. A tripod bracket (not shown) is a metal plate having holes into which fasteners such as screws secure the metal plate to the bottom surface of the bottom panel 459 of the body section 450. An opening is placed centrally in the metal surface for securing the pochade box 400 to the tripod 500. Such tripod mounting brackets are commercially available and are well known in the art.

Figure 10:
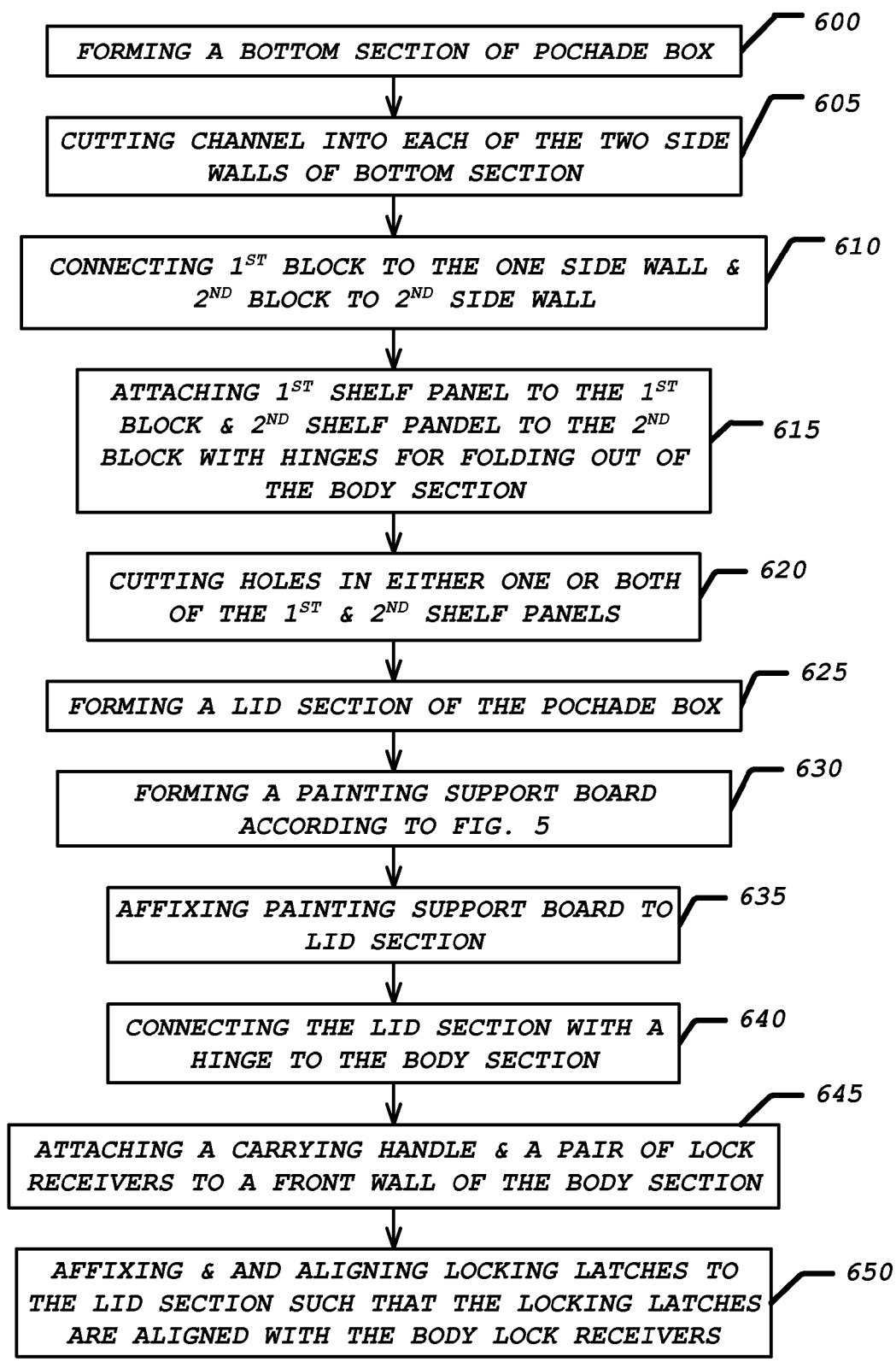
FIG. 10 is a flowchart illustrating a method for forming plein air pochade box including a painting support board embodying the principles of this disclosure.

FIG. 10 is a flowchart illustrating a method for forming a plein air pochade box including a painting support board embodying the principles of this disclosure. The method begins by forming (Box 600) a body section of the pochade box. A channel is cut (Box 605) into each of two sidewalls of the body section. A first block is hingedly connected (Box 610) to a first of the sidewalls and a second block is hingedly connected (Box 610) to a second of the sidewalls. A first shelf is attached (Box 615) to the first block and a second shelf is attached (Box 615) to the second block. Holes are cut (Box 620) in the surface of either one or both of the panels for use for holding painting tools such as brushes, palette knives, etc.

A lid section of the pochade box is formed (Box 625). A painting support board is formed (Box 630) as described in FIG. 5. The painting support board is affixed (Box 635) to the lid section and placed on the lid section such that the painting support board allows the lid section and the body section to mate to secure the pochade box. The lid is then hingedly connected (Box 640) to the body section of the pochade box. A carrying handle and a pair of lock receivers are then attached (Box 645) to a front wall of the body section. Locking Latches are then affixed and aligned (Box 650) to the lid section such that the locking latches are aligned with the body lock receivers.

While this disclosure has been particularly shown and described with reference to the preferred embodiments thereof, it will be understood by those skilled in the art that various changes in form and details may be made without departing from the spirit and scope of the disclosure.

What is claimed is:

1. An artist canvas or panel support system comprising:
   a rectangular painting support board formed of a rigid material having a length and a width for accommodating a largest of an artist's canvases or panels of wherein each of the artist's canvases or panels has a length, a width, and a thickness that differs from the other artist's canvases or panels;
   a coating applied to the painting support board of a color such that the painting support board mimics the color of a frame on which a painting on one canvas or panel may be mounted;
   a plurality of equally spaced lines placed on the surface of the painting support board to form a grid such that the artist is able to use the grid for approximating straight lines during painting, sketching or drawing and to gauge distance within a scene being painted, sketched or drawn during the painting, sketching, or drawing;
   a loop strip of a hook and loop fastener system adhered near the periphery of the painting support board;
   an opening formed in the rectangular painting support board to allow a person to carry the rectangular painting support board; and
   a mahl stick temporarily attached to the painting support board with the loop strip for aiding in detail or painting in a large area of the artist's panel when the paint is still wet for avoiding touching the surface accidentally, the mahl stick comprising:
      an elongated stick of a length and thickness and of a substance for providing support for an artist's arm and brush while painting, sketching or drawing; and
      a hook strip of a hook and loop system attached at one end of the elongated stick and covering an end tip of the elongated stick.

2. The artist canvas or panel support system of claim 1 wherein the painting support board has dimensions of from approximately ¼ inch to approximately ⅝ inch thick by approximately 23 inches wide by approximately 26 inches long.

3. The artist canvas or panel support system of claim 1 wherein the opening has dimensions of approximately 1.5 inches wide by 4 inches long.

4. The artist canvas or panel support system of claim 1 wherein the rigid material forming the painting support board is cellulose based fiber wallboard, plywood, an engineered wood product constructed of wood fibers assembled with adhesives, fiberglass panels, high density plastic laminated panels (i.e. high density polyethylene), or any rigid panel material.

5. The artist canvas or panel support system of claim 1 wherein the loop strip of the hook and loop system is attached to the painting support board as a continuous ½ inch strip indented ½ inch from the edge along at least three sides of the painting support board.

6. The artist canvas or panel support system of claim 1 wherein the loop strip is adhered to the painting support board such that the loop strip is replaceable when the loop strip has lost its adhesion properties during use.

7. The artist canvas or panel support system of claim 1 wherein the mahl stick has dimensions that are approximately 1 inch square and 18 inches long and the hook strip has dimensions of approximately 1 inch by 1 inch.

8. The artist canvas or panel support system of claim 1 wherein the mahl stick is wood.

9. A method for forming an artist canvas or panel support system comprising the steps of:
   forming a rectangular painting support board of a rigid material having a length and a width for accommodating a largest of an artist's canvases or panels wherein each of the artist's canvases or panels has a length, a width, and a thickness that differs from the other artist's canvases or panels;
   placing a plurality of equally spaced lines on the surface of the painting support board to form a grid such that the artist is able to use the grid to approximate straight lines during painting, sketching or drawing and to gauge distance within a scene being painted, sketched or drawn during the painting, sketching or drawing;
   adhering a loop strip of a hook and loop fastener system near the periphery of the painting support board;
   forming an opening in the rectangular painting support board to allow a person to carry the rectangular painting support board;
   forming a mahl stick to be temporarily attached to the paining support board with the loop strip for aiding in detail or painting in a large area of the artist's panel when the paint is still wet for avoiding touching the surface accidentally, comprising the steps of:
      forming an elongated stick of a length and a thickness and of a substance to provide support for an artist's arm and brush while painting, sketching or drawing,
      adhering a hook strip of a hook and loop system at one end of the mahl stick such that an end tip of the mahl stick is covered with the hook strip.

10. The method for forming the artist canvas or panel support system of claim 9 wherein the painting support board has dimensions of from approximately ¼ inch to approximately ⅝ inch thick by approximately 23 inches wide by approximately 26 inches long.

11. The method for forming the artist canvas or panel support system of claim 9 wherein the opening has dimensions of approximately 1.5 inches wide by 4 inches long.

12. The method for forming the artist canvas or panel support system of claim 9 wherein the rigid material forming the painting support board is cellulose based fiber wallboard, plywood, an engineered wood product constructed of wood fibers assembled with adhesives, fiberglass panels, high density plastic laminated panels (i.e. high density polyethylene), or any rigid panel material.

13. The method for forming the artist canvas or panel support system of claim 9 wherein the step of attaching the loop strip of the hook and loop system comprises the steps of:

forming the loop strip of the hook and loop system as a continuous ½ inch strip, and indenting the loop strip approximately ½ inch from the edge along at least three sides of the painting support board.

14. The method for forming the artist canvas or panel support system of claim 9 wherein the step of adhering the loop strip comprises the step of replacing the loop strip when the loop strip has lost its adhesion properties during use.

15. The method for forming the artist canvas or panel support system of claim 9 wherein the step of forming the mahl stick comprises the step of dimensioning the mahl stick approximately 1 inch square and 18 inches long and dimensioning the hook strip to be approximately 1 inch by 1 inch.

16. The method for forming the artist canvas or panel support system of claim 9 wherein the step of forming the mahl stick comprises fashioning the mahl stick from wood.

\* \* \* \* \*